US011328363B1

(12) United States Patent
Brannan et al.

(10) Patent No.: US 11,328,363 B1
(45) Date of Patent: May 10, 2022

(54) SYSTEMS AND METHODS FOR MANAGING INSURANCE PREMIUMS BASED UPON PEER-TO-PEER PROPERTY SHARING

(71) Applicant: State Farm Mutual Automobile Insurance Company, Bloomington, IL (US)

(72) Inventors: Joseph Robert Brannan, Bloomington, IL (US); Ryan Michael Gross, Normal, IL (US); Brian N. Harvey, Bloomington, IL (US); Aaron Williams, Congerville, IL (US); J Lynn Wilson, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 16/413,245

(22) Filed: May 15, 2019

Related U.S. Application Data

(60) Provisional application No. 62/821,862, filed on Mar. 21, 2019.

(51) Int. Cl.
   *G06Q 40/08* (2012.01)
   *G06Q 30/04* (2012.01)
(52) U.S. Cl.
   CPC ............ *G06Q 40/08* (2013.01); *G06Q 30/04* (2013.01)
(58) Field of Classification Search
   CPC ............................... G06Q 40/08; G06Q 30/04
   See application file for complete search history.

(56) References Cited

U.S. PATENT DOCUMENTS

| 8,046,243 | B2 | 10/2011 | Winkler | |
|---|---|---|---|---|
| 8,930,231 | B2 | 1/2015 | Bowne et al. | |
| 9,280,793 | B2 | 3/2016 | English et al. | |
| 9,916,625 | B2 | 3/2018 | Lehman et al. | |
| 10,467,702 | B1 * | 11/2019 | Harris, Jr. | G06Q 30/0645 |
| 10,521,864 | B1 * | 12/2019 | Davis | G06Q 40/08 |
| 10,540,723 | B1 * | 1/2020 | Potter | G08B 21/02 |
| 10,832,335 | B1 * | 11/2020 | Floyd | G06Q 30/0609 |
| 10,956,972 | B2 * | 3/2021 | Miyamoto | G06Q 20/40 |
| 2003/0009355 | A1 * | 1/2003 | Gupta | G06Q 10/10 705/2 |
| 2005/0160022 | A1 | 7/2005 | Chesney | |
| 2006/0277077 | A1 | 12/2006 | Coleman | |

(Continued)

*Primary Examiner* — Bruce I Ebersman
*Assistant Examiner* — Matthew Cobb
(74) *Attorney, Agent, or Firm* — Armstrong Teasdale LLP

(57) ABSTRACT

A property sharing insurance management ("PSIM") computing device for analyzing data from a property sharing platform to adjust insurance premiums for an offerer of a property may be provided. The PSIM computing device may include at least one processor programmed to (i) receive, from a data source, a plurality of property data, (ii) store the property data in a plurality of data records in a database, wherein each data record is associated with one property and stores the plurality of property data for that property, (iii) analyze the property data for the property, (iv) determine a percentage of time that the property is used for commercial purposes in an insurance billing cycle, and (v) process one or more adjusted insurance premiums for the offerer based upon the determined percentage of time that the property is used for commercial purposes in the insurance billing cycle.

20 Claims, 7 Drawing Sheets

(56) References Cited

U.S. PATENT DOCUMENTS

| | | |
|---|---|---|
| 2007/0136109 A1 | 6/2007 | Yager et al. |
| 2016/0155110 A1* | 6/2016 | Wright .............. G06Q 20/4016 |
| | | 705/4 |
| 2016/0328766 A1* | 11/2016 | Krejci .................... G06Q 50/26 |
| 2018/0047106 A1* | 2/2018 | Snyder ............... G06Q 30/0645 |
| 2018/0060981 A1* | 3/2018 | Sher ..................... G06Q 50/163 |
| 2018/0075380 A1* | 3/2018 | Perl ........................ G06Q 50/30 |
| 2018/0174264 A1* | 6/2018 | Stock ................ G06Q 30/0609 |
| 2018/0336650 A1 | 11/2018 | Jessen |
| 2020/0065869 A1* | 2/2020 | Tiderington ........... G06Q 10/02 |

\* cited by examiner

SYSTEMS AND METHODS FOR MANAGING INSURANCE PREMIUMS BASED UPON PEER-TO-PEER PROPERTY SHARING

CROSS-REFERENCE TO RELATED APPLICATIONS

This application is related to U.S. Provisional Patent Application Ser. No. 62/821,862, filed Mar. 21, 2019, entitled "SYSTEMS AND METHODS FOR MANAGING INSURANCE PREMIUMS BASED UPON PEER-TO-PEER PROPERTY SHARING," the entire contents and disclosure of which are hereby incorporated by reference herein in its entirety.

FIELD OF THE DISCLOSURE

The present disclosure relates to determining adjusted insurance premiums for shared property insurance premiums, and more particularly, to computer-based systems and methods for determining adjusted insurance premiums for a piece of shared property used in a peer-to-peer sharing environment based upon how often the shared property is used commercially.

BACKGROUND

The market for peer-to-peer property sharing (e.g., ride-sharing, car sharing, and home sharing) has become increasingly popular among consumers. Property sharing allows owners of property to offset the cost of the property by sharing it (e.g., allowing others to rent the property).

However, in known property sharing platforms, both owners and renters may pay for insurance on the same property. Specifically, owners pay their insurance premium to insure the property, and the renters pay for insurance on the property when they are renting it. For example, a renter may rent a property on a property sharing platform, and the property sharing platform may provide insurance for the property through fees paid by the renter. That is, the property is "double insured" when it is rented.

BRIEF SUMMARY

The present embodiments may relate to systems and methods for analyzing data from a property sharing platform to adjust insurance premiums for an offerer of a property. In one embodiment, the systems and methods may use a property sharing insurance management ("PSIM") computing device to perform the analysis and adjust the insurance premiums.

In one aspect, a PSIM computing device for analyzing data from a property sharing platform to adjust insurance premiums for an offerer of a property may be provided. The offerer may have an insurance policy on the property and may pay an insurance premium for the insurance policy, and the PSIM computing device may include at least one processor in communication with at least one memory device. The processor may be programmed to (i) receive, from a data source, a plurality of property data, (ii) store the received property data in a plurality of data records in a database, wherein each data record is associated with one property and stores the plurality of property data for that property, (iii) analyze the property data for the property, (iv) determine, based upon the analyzed property data, a percentage of time that the property is used for commercial purposes in an insurance billing cycle, and/or (v) process one or more adjusted insurance premiums for the offerer based upon the determined percentage of time that the property is used for commercial purposes in the insurance billing cycle, wherein the one or more adjusted insurance premiums includes one or more reimbursements of a portion of the insurance premium to the offerer. The PSIM computing device may include additional, less, or alternate functionality, including that discussed elsewhere herein.

In another aspect, a computer-implemented method for analyzing data from a property sharing platform to adjust insurance premiums for an offerer of a property may be provided. The offerer may have an insurance policy on the property and may pay an insurance premium for the insurance policy. The method may be implemented using a PSIM computing device. The method may include (i) receiving, from a data source, a plurality of property data, (ii) storing the received property data in a plurality of data records in a database, wherein each data record is associated with one property and stores the plurality of property data for that property, (iii) analyzing the property data for the property, (iv) determining, based upon the analyzed property data, a percentage of time that the property is used for commercial purposes in an insurance billing cycle, and/or (v) processing one or more adjusted insurance premiums for the offerer based upon the determined percentage of time that the property is used for commercial purposes in the insurance billing cycle, wherein the one or more adjusted insurance premiums includes one or more reimbursements of a portion of the insurance premium to the offerer. The method may include additional, less, or alternate actions, including those discussed elsewhere herein.

In a further aspect, at least one non-transitory computer-readable media having computer-executable instructions thereon may be provided. When executed by at least one processor of a PSIM computing device, the instructions may cause the at least one processor of the PSIM computing device to (i) receive, from a data source, a plurality of property data, (ii) store the received property data in a plurality of data records in a database, wherein each data record is associated with one property and stores the plurality of property data for that property, (iii) analyze the property data for a property, wherein the property is offered by an offerer, and wherein the offerer has an insurance policy on the property and pays an insurance premium for the insurance policy, (iv) determine, based upon the analyzed property data, a percentage of time that the property is used for commercial purposes in an insurance billing cycle, and (v) process one or more adjusted insurance premiums for the offerer based upon the determined percentage of time that the property is used for commercial purposes in the insurance billing cycle, wherein the one or more adjusted insurance premiums includes a reimbursement of a portion of the insurance premium to the offerer. The instructions may direct additional, less, or alternate functionality, including that discussed elsewhere herein.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
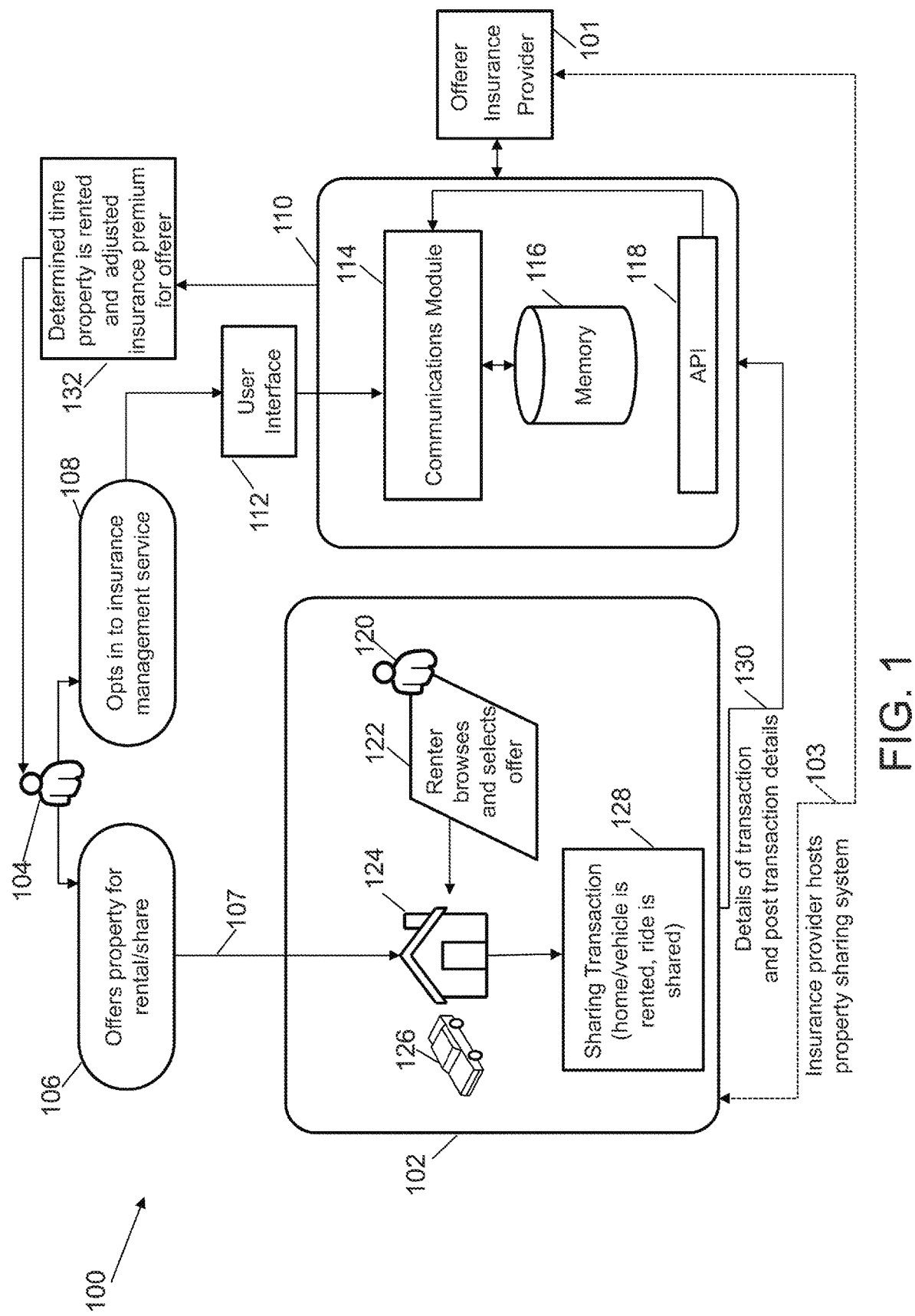
FIG. 1 illustrates a flow chart of an exemplary process of managing property sharing insurance for a property sharing system.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for generating and managing insurance premiums relating to one or more peer-to-peer shared properties. In one exemplary embodiment, the process may be performed by a property sharing insurance management ("PSIM") computing device (also referred to herein as a PSIM server) associated with an insurance provider.

As described below, the systems and methods described herein may leverage property sharing data to determine an amount of time that a property is used for commercial purposes (e.g., shared/rented using a peer-to-peer property sharing service) and adjust an insurance premium for an owner (also known as an offerer or offeror) of the property based upon the determined amount of time that the property is used for commercial purposes. In other words, the systems and methods described herein may provide an adjusted insurance premium for offerers that may include at least a partial reimbursement of insurance premiums for offerers of rental/shared property based upon the amount of time that the property is rented. Accordingly, the systems and methods described herein may ensure that an offerer is not paying for double insurance (e.g., the offerer is not paying for insurance when a renter of the property is also paying for insurance of the property through the peer-to-peer property sharing service).

Peer-to-Peer Property Sharing Services

Peer-to-peer property sharing services (also known as property sharing systems) may allow for the exchange of property and/or services on an individual basis, so that individuals are exchanging property and/or services with other individuals. Examples of these exchanges may include, but are not limited to, car sharing, ride sharing, and residence sharing. In most property sharing systems, a list of individuals who are willing to offer their property and/or services, also known as offerers, list their properties on a website or other online platform for potential renters. If the renter wishes to rent the property, they may conduct an exchange of money for temporary use of the property, using the property sharing system. Generally, the offerer may insure their property before offering it to others. In some embodiments, the offerer may be required to insure their property (e.g., in the case of homeowners required to insure their property, vehicle owners required by state law to insure their vehicle, and the like). An insurance provider that insures the property of the offerer may be referred to as "offerer insurance provider."

Further, the property sharing system may also insure the property when it is rented out in a transaction conducted using their system. An insurance provider that insures the property on behalf of the property sharing system may be referred to as "property sharing insurance provider." That is, in some instances, the property may be "double insured" when the property is rented out via the property sharing system.

In the exemplary embodiment, the offerer may list the item on a property sharing platform along with the price and/or conditions for the exchange. The property sharing platform may require that the offerer include information about their insurance in the listing as well. In the example of car sharing (e.g., via TURO and the like), a listing provided on the property sharing platform may include pictures of the car, features of the car, a make and model of the car, a gas mileage of the car, a cost to rent the car per hour and/or per day, and/or conditions, such as maximum mileage that can be driven in the car, whether smoking is allowed in the car, and/or a minimum age to drive the car. In the example of residence sharing (e.g., via AIRBNB, VRBO, and the like), the offerer may include pictures of the residence, a listing of the amenities of the residence, a cost to rent the residence per night and/or per week, and/or conditions, such as minimum stay and/or whether pets are allowed.

A potential renter may browse through the listings of offers to determine which property is most appropriate for them. The potential renter may then select an offer on the property sharing platform, and the property sharing platform may then inform the offerer. Information about the offerer and the renter, as well an appropriate payment associated with the offer, may be exchanged, completing the transaction.

In the exemplary embodiment, a property sharing insurance provider may be associated with a property sharing system, such as, but not limited to, a car sharing, a residence-sharing, and/or a ride sharing system. In some embodiments, the property sharing system may be hosted by the property sharing insurance provider. In other embodiments, the property sharing system may be separate from the property sharing insurance provider, and the property sharing insurance provider may be in communication with the property sharing system. The property sharing insurance provider may provide insurance products to the property sharing system, such as individual insurance policies associated with each transaction conducted over the property sharing system and/or a general or "overall" insurance policy that covers claims associated with any such transaction.

In the exemplary embodiment, an offerer may offer their property, which is insured through the offerer insurance provider, through the property sharing system. The offerer insurance provider may be the same as or different from the property sharing insurance provider.

In the exemplary embodiment, the offerer may communicate their desire to opt in to a property sharing insurance management ("PSIM") server through a user interface. That is, the offerer may opt in to receive a reimbursement determined by the PSIM server for time that their property is shared/rented through the property sharing platform, as described with more detail below.

In the exemplary embodiment, the PSIM server may be associated with the offerer insurance provider and/or the property sharing insurance provider. In other embodiments, the PSIM server may be separate from but in communication with the offerer insurance provider and/or the property sharing insurance provider.

The PSIM server may be configured to access and leverage property sharing data to identify when a property, insured by the offerer insurance provider, is the subject of a transaction on the property sharing system. During such times, the property may be insured by the property sharing insurance provider of the property sharing system. The PSIM server may be further configured to provide the offerer with an adjusted insurance premium that may include an insurance reimbursement for those times that the offerer's property is the subject of a transaction on the property sharing system, and is therefore insured by the property sharing insurance provider (and need not be "double-insured" by the offerer insurance provider).

If the PSIM server is separate from property sharing system and/or from the property sharing insurance provider, the PSIM server may gain access to property sharing data from the property sharing system through an access token obtained from the property sharing system (e.g., to ensure data security of the property sharing data). The PSIM server may retrieve insurer data about the offerer, the insurer data including data about the offerer based upon offerer's one or more insurance policies with the offerer insurance provider (which may be provided to the property sharing system during a registration process). In some embodiments, the insurer data may include additional data about the one or more items being offered by the offerer and the specific insurance policies covering those items.

Examples of offers include, but are not limited to, vehicle sharing (e.g., offerer's vehicle is being offered for use by the renter for a period of time), residence sharing (e.g., offerer's residence is being offered for rent for a period of time), and/or ride sharing (e.g., offerer is offering to drive the renter from one point to another point). A residence may include, but is not limited to, a house, an apartment, a townhouse, a condominium, a guest house, a mobile home, a shared room, a couch in a living room, and/or any other place to stay. A vehicle may include, but is not limited to, an automobile, a boat, an aircraft, a bicycle, a motorcycle, a recreational vehicle ("RV"), an autonomous vehicle, a flying car, and/or any other vehicle. In the exemplary embodiment, the offerer may offer his/her residence and/or vehicle to share for a specific price. The offer may be listed within the PSIM server among a plurality of other offers by a plurality of other offerers when the PSIM server and the property sharing platform are related, as described below. In these embodiments, the listings may be stored and displayed by the PSIM server. In other embodiments, where the PSIM server and the property sharing platform are not related, the offer may just be listed on the property sharing platform.

Renters may browse the plurality of offers included within the property sharing platform, which, in some embodiments, may be the PSIM server. In the exemplary embodiment, the plurality of offers is hosted on an online application. As such, the application may be a web-hosted application or mobile application that allows the renter to browse and/or search through the listings of offers using a user computing device (e.g., a personal computer, smartphone, etc.). When the renter selects an offer, a notification is sent to the offerer, and the item in the offer is rented to the renter.

In the exemplary embodiment, when a property sharing transaction is processed (which may occur before, during, or after the rental is completed), the PSIM server may obtain and store information about the transaction, also referred to as "property sharing transaction data." For example, the property sharing transaction data may include a duration of how long the property is being rented, time(s)/date(s) of the rental, claim history during the rental, pictures of any damage to the rental, and any other relevant information. In the exemplary embodiment, the PSIM server may process the property sharing transaction data and determine how often an offerer's property is, or has been, rented out by renters. The PSIM server may make such a determination after each rental and/or periodically (e.g., at the end of each month, quarter, year, etc.). Based upon this determination, the PSIM server may determine an adjusted insurance premium amount for the offerer's insurance premium that may include an amount of the offerer's premium to be returned to the offerer.

As described above, property may be "double insured" when the property is rented out, because the offerer must insure their property and the renter, through the property sharing platform, must insure the property when they are renting it. In the exemplary embodiment, the PSIM server may ensure that the offerer is not paying for insurance on the property when the property is insured by the property sharing platform, and the PSIM server may determine an adjusted insurance premium amount of the offerer's insurance premium to be returned to the offerer.

Property Sharing Insurance Management and Vehicle Sharing

Vehicle sharing on property sharing systems refers to a transaction where an offerer allows a renter to rent their vehicle for a predetermined amount of time and money. For example, an offerer may offer their vehicle on a property sharing platform (e.g., TURO) to a renter for 12 hours for a rate of $100. During the time that the renter is renting the vehicle, the vehicle may be insured by the property sharing platform and the offerer's own insurance policy, and the vehicle therefore may be "double-insured," as described above. The property sharing platform may send a signal (e.g., transaction details) to the PSIM server when the vehicle is rented. From the signal, the PSIM server may determine that the vehicle is "double-insured" throughout the period of time that the vehicle is rented and may store the "double-insured" information.

In some instances, an offerer's vehicle insurance premium for their insurance policy may be at least partially determined by how many miles the offerer drives annually. For example, an offerer who drives less than 5,000 miles per year may have a smaller insurance premium than an offerer who drives over 15,000 miles per year. In the exemplary embodiment, the PSIM server may be further configured to determine how many miles are driven by renters of the vehicle over a predetermined period of time (e.g., annually) in addition to how much time the vehicle is rented by renters.

In these embodiments, the PSIM server may subtract the determined number of miles driven by renters from the total number of miles driven on the car in the predetermined time period. The PSIM server may then compare the determined number of miles driven by the offerer in the predetermined period of time to a mileage bracket of the insurance policy of the offerer. Based upon this comparison, the PSIM server may determine whether the offerer is in a lower mileage bracket than the bracket that they paid the insurance premium on. Accordingly, PSIM server may place the offerer in the lower mileage bracket and process a reimbursement for the offerer based upon an adjusted insurance premium, where the reimbursement represents a difference between the paid insurance premium and an insurance premium of the lower mileage bracket. This reimbursement may be processed separate from or along with the reimbursement for when the vehicle is "double-insured."

Property Sharing Insurance Management and Ride Sharing

Ride sharing on property sharing systems refers to a transaction where an offerer provides a ride for a renter for a predetermined amount of money. For example, an offerer may offer their driving services on a property sharing platform (e.g., UBER or LYFT) for a rate of $0.75 per mile. During the time that the offerer is using their vehicle in a ride sharing capacity, the vehicle may be insured by the property sharing platform as well as the offerer's own insurance policy. Therefore, the vehicle may be "double-insured" in these instances.

In some embodiments, the PSIM server may receive a signal (e.g., transaction details) from the property sharing platform that indicates when the vehicle is being used for ride sharing. The PSIM server may determine when the vehicle is "double-insured" from the signal and provide the offerer with a reimbursement for their insurance premium for times when the offerer is using their vehicle in a ride sharing capacity. In ride sharing transactions, the offerers use their own vehicles and do not rent the vehicles to renters. Accordingly, in ride sharing transactions, the offerer may not be eligible for a reduced mileage bracket associated with their insurance, as described above with respect to vehicle sharing.

Telematics Data and Mobile Device Data Related to Vehicle Sharing

In some embodiments, the property sharing system that enables vehicle sharing may be included in a software application (e.g., on a mobile device of a renter). The application may include features that allow renters to accept offers (e.g., from the property sharing system) and seamlessly access the vehicle (e.g., with keyless entry) through their mobile devices. Further, the application may include features that allow the PSIM server to receive mobile and telematics data while the renter is using the vehicle. The mobile and telematics data may include data from sensors on the mobile device (e.g., GPS and accelerometer) running the application and data from vehicle sensors (e.g., GPS, accelerometer, and engine sensors) that communicate with the application via the mobile device. The application may communicate the data wirelessly to the PSIM server in real-time, periodically, and/or at predetermined times (e.g., when the renter is done renting the vehicle).

In embodiments where the PSIM server receives mobile and telematics data from the renter of the vehicle, the data may transfer from the mobile device running the application directly to the PSIM server. Accordingly, the PSIM server may receive information regarding when a renter enters/exits the vehicle and how many miles are driven by the renter in real-time (e.g., during a trip and/or after an offer/transaction is completed). Further, the PSIM server may receive telematics data from the vehicle and/or the mobile device running the application regarding the renter's usage of the vehicle. Specifically, the telematics data indicates how the renter is operating the vehicle (e.g., where the vehicle was driven, how fast the vehicle was driven, if the vehicle made any sudden stops or quick lane changes, general driving quality of the renter, braking, cornering, speed, acceleration, deceleration, heading, route, time of day, GPS location, etc). The telematics data may also include vehicle-mounted sensor data and/or mobile device sensor data, and be generated by vehicle-mounted sensors and/or mobile device sensors. In some embodiments, the telematics data may also include image data from various vehicle-mounted sensors or cameras, the image data may include views of the exterior of the vehicle, as well as the interior during use.

The PSIM server may use the telematics data received from the vehicle for specific renters to determine a driving score for the renters. In some embodiments, the reimbursement for offerers may be greater the higher the driving score of the renters. Further, in embodiments where the insurance provider associated with the PSIM hosts the property sharing platform, the insurance provider may determine the renter's insurance premium based upon their driving score. For example, the insurance provider may charge a greater premium for a renter with a low driving score.

Property Sharing Insurance Management and Residence Sharing

Residence sharing on property sharing systems refers to a transaction where an offerer allows a renter to rent their residence for a predetermined amount of time and money. For example, an offerer may offer their residence on a property sharing platform (e.g., AIRBNB or VRBO) for a rate of $85 per night. During the time that the offerer rents their residence, the residence may be insured by the property sharing platform as well as the offerer's own insurance policy. Therefore, the residence may be "double-insured" in these instances.

In some embodiments, the PSIM server may receive a signal (e.g., transaction details) from the property sharing platform that indicates when the residence is being used for residence sharing. The PSIM server may determine when the vehicle is "double-insured" from the signal and provide the offerer with a reimbursement for their insurance premium for times when the offerer is renting their residence to a renter.

At least one of the technical problems addressed by this system may include: (i) lack of identification of when a property is "double-insured,"; (ii) inability to reimburse property owners for such "double-insured" periods; (iii) poor speed and/or accuracy of issuing a reimbursement on an insurance policy when the property is "double-insured" during at least one property sharing transaction; (iv) lack of overall data on the commercial use of a property; and/or (v) lack of data to make insurance decisions about property sharing insurance policies for property sharing transactions.

The methods and systems described herein may be implemented using computer programming or engineering techniques including computer software, firmware, hardware, or any combination thereof, wherein the technical effects may be achieved by performing at least one of the following steps: (a) receive, from a data source, a plurality of property data, (b) store the received property data in a plurality of data records in a database, wherein each data record is associated with one property and stores the plurality of property data for that property, (c) analyze the plurality of property data for the property, (d) determine a percentage of time that the property is used for commercial purposes in an insurance billing cycle, and (e) process one or more adjusted insurance premiums for the property offerer based upon the determined percentage of time, including at least partial returns on insurance premiums for the property offerer, wherein the one or more adjusted insurance premiums includes one or more reimbursements of a portion of the insurance premium to the offerer.

At least one of the technical solutions addressed by this system may include: (i) identifying when a property is "double-insured"; (ii) reimbursing property owners for the identified "double-insured" periods; (iii) improved speed and/or accuracy of issuing a reimbursement on an insurance policy when the property is "double-insured" during at least one property sharing transaction; (iv) collecting data on the commercial use of property; and/or (v) collecting data to make insurance decisions about property sharing insurance policies for property sharing transactions.

Exemplary Process for Managing Property Sharing Insurance

FIG. 1 illustrates a flow chart of an exemplary computer-implemented process 100 for managing insurance premiums for a property associated with a property sharing transaction. In the exemplary embodiment, an offerer insurance provider 101 may be associated with and provide one or more insurance policies to a property sharing system 102, such as, but not limited to, a ride-sharing, a car-sharing, and/or a residence-sharing system. Further, in the exemplary embodiment, property sharing system 102 may be hosted 103 by offerer insurance provider 101. In other embodiments, property sharing system 102 may be separate from offerer insurance provider 101, and offerer insurance provider 101 may be in communication with property sharing system 102.

In the exemplary embodiment, an offerer 104 may offer 106 their property for rental and/or share through property sharing system 102. Offerer insurance provider 101 may provide offerer 104 with one or more insurance policies on their property. That is, in the exemplary embodiment, offerer insurance provider 101 may be both a property sharing insurance provider and the offerer's insurance provider.

Offerer 104 may opt in 108 to a property sharing insurance management ("PSIM") service provided by offerer insurance provider 101 through a PSIM server 110. In the exemplary embodiment, offerer 104 may communicate the desire to opt in 108 to the PSIM service of PSIM server 110 through a user interface 112 (e.g., on a user computing device of offerer 104, not specifically shown), which may enable communication with a communications module 114 of PSIM server 110. In other embodiments, offerer insurance provider 101 may automatically enroll offerer 104 into the PSIM service of PSIM server 110 if offerer 104 is eligible for the PSIM service (e.g., if offerer offers property for rental and/or share and the property is insured by offerer insurance provider 101). In the exemplary embodiment, PSIM server 110 may be associated with offerer insurance provider 101 that insures offerer 104 and/or property sharing system 102. In the exemplary embodiment, insurer data may be communicated to the PSIM server 110 and stored in a memory 116 thereof.

Insurer data may include data about offerer 104 (e.g., personal address, banking account numbers, and properties owned) and data on one or more of offerer's 104 insurance policies with offerer insurance provider 101 (e.g., insurance premium amount for each property). In some further embodiments, insurer data may also include additional data about the property being offered on property sharing system 102, such as the offerer's 104 residence 124 and/or car 126, which are covered by an insurance policy from offerer insurance provider 101. Examples of offers 107 include, but are not limited to, residence rental (where offerer's 104 residence 124 is being offered for rent for a period of time), vehicle ride (where offerer 104 is offering to drive a renter 120 from one point to another point), and vehicle rental (where offerer's 104 vehicle 126 is being offered for use for a period of time).

In the exemplary embodiment, offerer 104 may offer 106 his/her residence 124 and/or vehicle 126 to share for a specific price and/or according to various conditions described in each offer 107. Each individual offer 107 may be listed among a plurality of other offers associated with a plurality of other offerers (not specifically shown) on property sharing system 102. In some embodiments, such as where PSIM server 110 is associated with property sharing system 102, offers 107 may be stored and displayed by PSIM server 110.

In the exemplary embodiment, a renter 120 may also register with property sharing system 102. Property sharing system 102 and/or may provide insurance for residence 124 and/or vehicle 126 (e.g., on behalf of renter 120 and/or property sharing system 102) that is separate from the owner's insurance. In some embodiments, this insurance (e.g., renter's insurance) may be offered by offerer insurance provider 101. In other embodiments, the renter's insurance may be offered by insurance providers other than offerer insurance provider 101.

Once registered, renter 120 may browse the plurality of offers 107. In the exemplary embodiment, the plurality of offers 107 are hosted on an online application (e.g., by property sharing system 102 and/or PSIM server 110). As such, the application may be a web-hosted application or mobile application that allows (i) offerer 104 to list property available for rental in offers 10, and (ii) renter 120 to browse and/or search through the listings of offers 107. When renter 120 selects 122 an offer, a notification is sent to offerer 104, information and/or money is exchanged between renter 120, property sharing system 102, and/or offerer 102, and the residence 124 and/or vehicle 126 is rented 128 to renter 120.

In the exemplary embodiment, PSIM server 110 may retrieve 130 details of a transaction when the residence 124 and/or vehicle 126 is rented 128 and post-transaction details after the residence 124 and/or vehicle 126 is rented 128 from property sharing system 102. In some embodiments, PSIM server 110 may be related to and/or associated with property sharing system 102, and PSIM server 110 may retrieve 130 the transaction and/or post-transaction details from memory 116. In other embodiments, PSIM server 110 may be separate from property sharing system 102, and PSIM server 110 may retrieve 130 the transaction and/or post-transaction details from property sharing system 102 through an access token obtained from property sharing system 102 (e.g., to ensure data security of the property sharing data).

The transaction details may include information about offerer 104, residence 124 and/or vehicle 126 being rented, offer 107 (e.g., duration of offer 107, price for renter 120 to rent 128 residence 124 and/or vehicle 126, and the renter's insurance provided by property sharing system 102), and renter 120. The post-transaction details may include information about any claims filed when residence 124 and/or vehicle 126 were rented 128 by renter 120, data about vehicle 126 (e.g., mileage driven when vehicle 126 was rented 128 and telematics data), and a condition of residence 124 and/or vehicle 126 after being rented 128.

In the exemplary embodiment, once renter 120 rents 128 residence 124 and/or vehicle 126, PSIM server 110 may determine 132 an amount of time residence 124 and/or vehicle is rented 128 (e.g., used commercially) compared to an amount of time residence 124 and/or vehicle 126 is used by offerer 104 personally. PSIM server 110 may determine 132 the amount of time residence 124 and/or vehicle 126 is rented 128 after every rental thereof, periodically (e.g., based upon length or billing cycle of insurance policy of offerer 104), and/or only upon request from offerer 104. In some embodiments, PSIM server 110 may determine 132 a percentage of time that residence 124 and/or vehicle was rented 128 and determine 132 an adjusted insurance premium accordingly.

The adjusted insurance premium may include a reimbursement of at least a portion of the insurance premium to offerer 104. For example, if residence 124 and/or vehicle 126 are rented for 15% of a billing cycle, PSIM server 110 may determine 132 that the adjusted insurance premium for offerer 104 is a 15% adjustment to their insurance premium and issue a 15% reimbursement to offerer 104. PSIM server 110 may make this determination 132 by analyzing the retrieved 130 transaction and/or post-transaction details. In other embodiments, PSIM server 110 may determine 132 the adjusted insurance premium to be a predetermined amount per property (e.g., residence 124 and/or vehicle 126) being rented 128. For example, PSIM server 110 may determine 132 that offerer 104 may receive $5 per day that their residence 124 is rented 128.

Further, PSIM server 110 may use other factors (e.g., risk associated with day/time of rental and holiday rental vs. non-holiday rental) in determining 132 the adjusted insurance premium. For example, because there may be more risk associated with renting 128 on weekends, PSIM server 110 may determine 132 a greater reimbursement for weekends compared to weekdays. Further, for example, because holiday rentals may be more in demand than non-holiday rentals, PSIM server 110 may determine 132 a greater reimbursement for holidays compared to non-holidays.

In the exemplary embodiment, the determined 132 amount of time and adjusted insurance premium for offerer 104, along with the transaction and post-transaction details, may be stored in memory 116 of PSIM server 110 (e.g., each amount of time and reimbursement may be individually stored in a separate location of memory 116, and/or a cumulative amount of time over a predetermined length of time may be stored and updated). Further, the determined 132 amount of time and adjusted insurance premium may be distributed to offerer insurance provider 101 such that offerer insurance provider 101 may collect and analyze the data on the commercial use of property, which may be used to make insurance decisions about property sharing insurance policies for property sharing transactions.

Offerer insurance provider 101 and property sharing system 102 may be capable of communicating with PSIM server 110 though an application programming interface (API) 118. In the exemplary embodiment, PSIM server 110 may include a firewall (not shown) to protect the private and/or personally identifiable information of offerer 104 and renter 120. As the determined 132 amount(s) of time and reimbursement(s) are modified or additional information is received 130, more data may be added to the databases of memory 116.

Exemplary Process for Reimbursement

Figure 2:
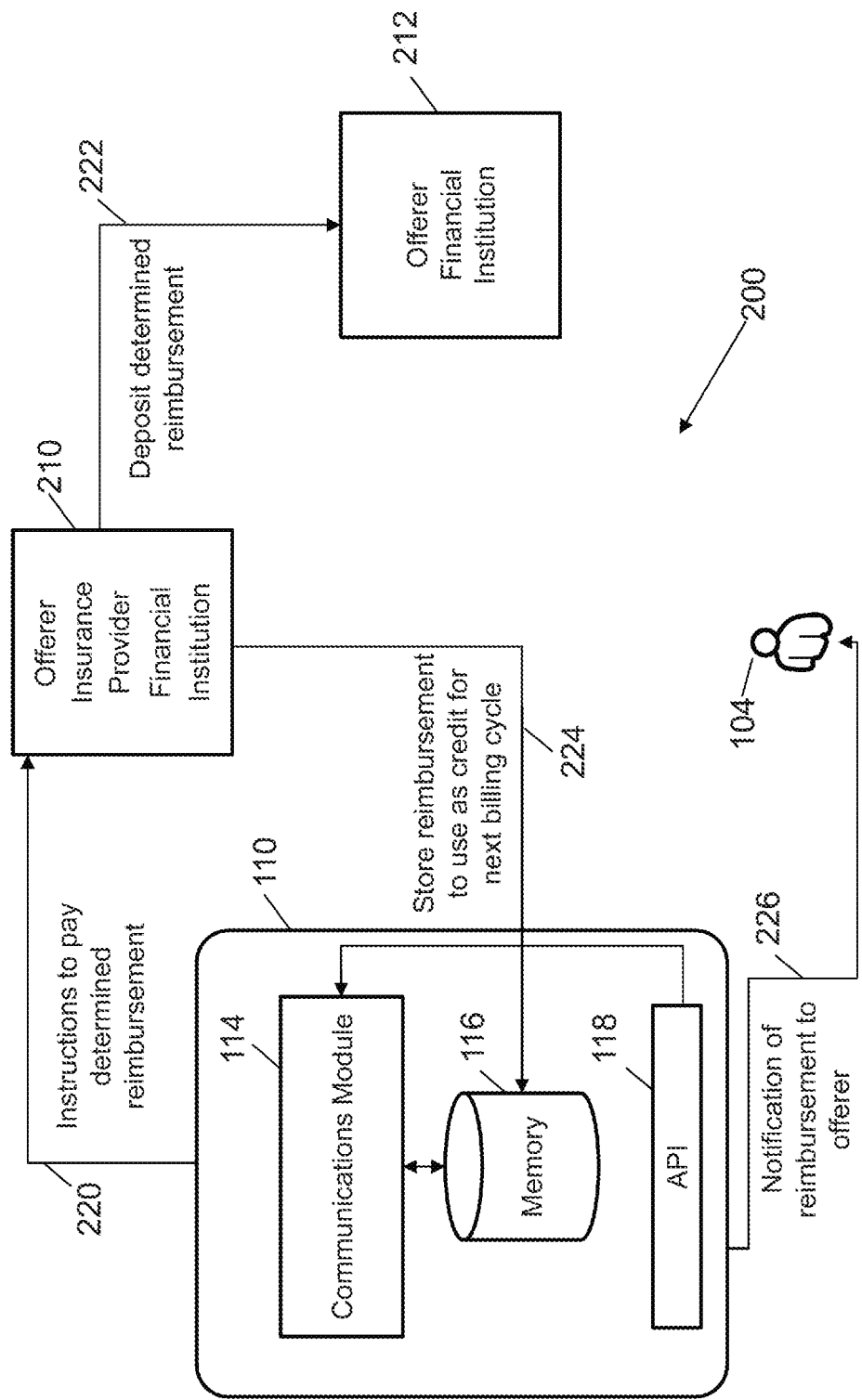
FIG. 2 illustrates a flow chart of an exemplary process for reimbursing an offerer following the process shown in FIG. 1.

FIG. 2 depicts a simplified block diagram of an exemplary process 200 for reimbursement of a portion of an insurance premium to an offerer 104. That is, FIG. 2 relates to the processing 200 of the reimbursement of the insurance premium. As shown in FIG. 1, PSIM server 110 determines 132 an amount of time a property (e.g., residence 124 and/or vehicle 126) is rented and calculates an adjusted insurance premium for offerer 104 based upon the determined 132 time. In the exemplary embodiment, process 200 may be implemented to reimburse (e.g., by providing a reimbursement) offerer 104 based upon the determined 132 amount of time and adjusted insurance premium.

In the exemplary embodiment, PSIM server 110 may be in communication with an offerer insurance provider financial institution 210, an offerer financial institution 212, and offerer 104 (e.g., via a user computing device of offerer 104, not specifically shown). Offerer insurance provider financial institution 210 may be any financial institution (e.g., a bank) engaged in financial and/or monetary services for offerer insurance provider 101 (shown in FIG. 1). Specifically, offerer insurance provider financial institution 210 maintains at least one financial account on behalf of offerer insurance provider 101. Offerer financial institution 212 may be any financial institution engaged in financial and/or monetary services for offerer 104. Specifically, offerer financial institution 212 maintains at least one financial account on behalf of offerer 104.

In the exemplary embodiment, PSIM server 110 may transmit instructions 220 to offerer insurance provider financial institution 210. Instructions 220 may direct offerer insurance provider financial institution 210 to disburse funds in the determined 132 reimbursement amount to the payment account of offerer 104 at offerer financial institution 212. Upon receiving instructions 220, offerer insurance provider financial institution may, in turn, deposit 222 funds in the determined 132 reimbursement amount into the payment account of offerer 104 at offerer financial institution 212. Additionally or alternatively, offerer insurance provider financial institution 210 (and/or offerer insurance provider 101) may store 224 the determined 132 reimbursement amount for use as a credit in the subsequent billing cycle (e.g., in memory 116 of PSIM server 110 and/or in any other storage location and/or storage device). If the determined 132 reimbursement amount is stored 224, PSIM server 116 (and/or offerer insurance provider 101) may deduct the credit from an insurance premium that offerer 104 has to pay for a subsequent billing cycle.

In the exemplary embodiment, PSIM server 110 may notify 226 offerer 104 of the determined 132 reimbursement amount being deposited 222 and/or stored 224 as credit. Additionally or alternatively, offerer financial institution 212 may also notify (not shown) offerer 104 of the determined 132 reimbursement being deposited 222. In some embodiments, notifications 226 may be in the form of message and/or email to user interface 112 (shown in FIG. 1) of offerer 104.

Exemplary Computer Network

Figure 3:
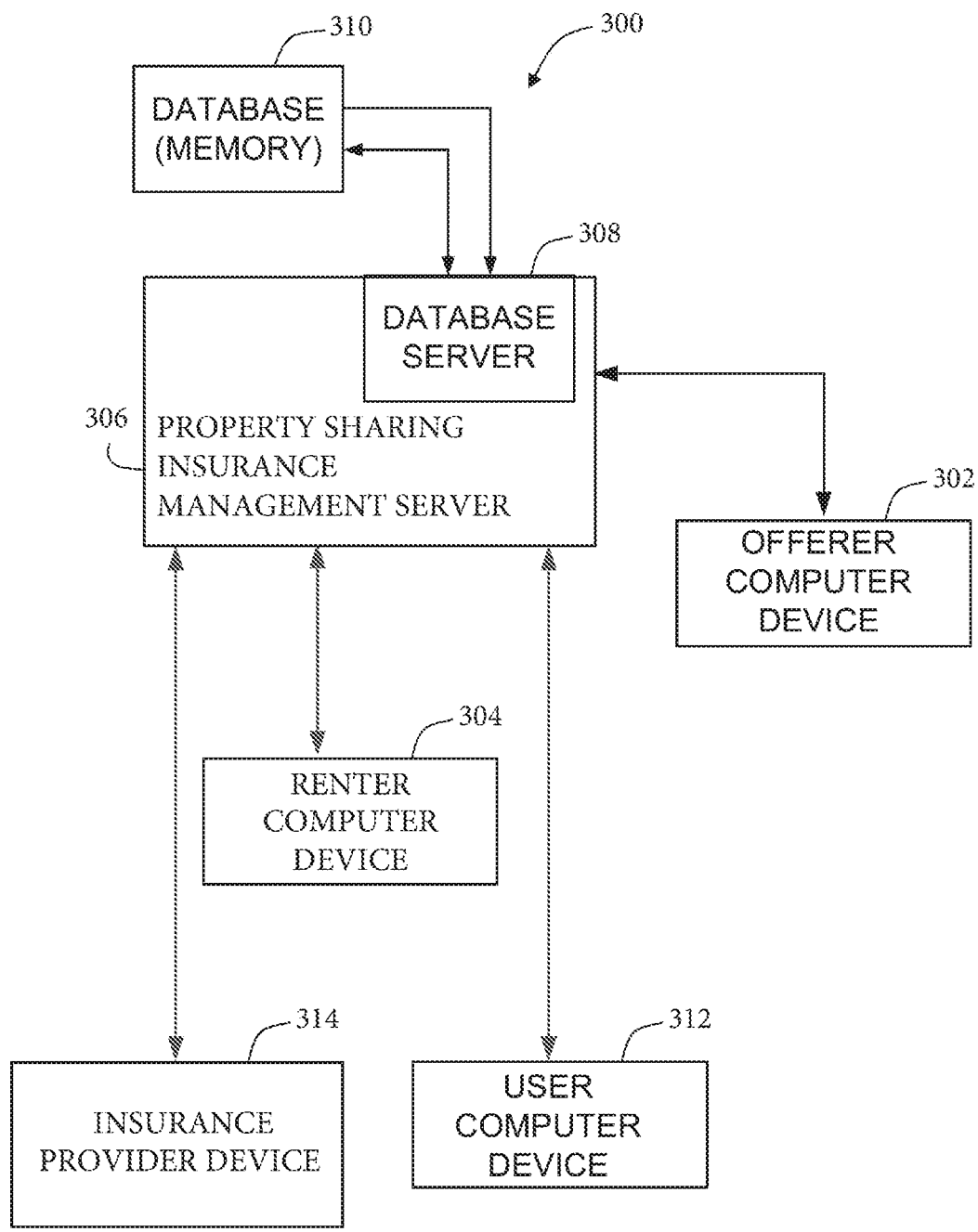
FIG. 3 illustrates a simplified block diagram of an exemplary computer system for implementing the process shown in FIG. 1.

FIG. 3 depicts a simplified block diagram of an exemplary system 300 for implementing process 100 shown in FIG. 1. In the exemplary embodiment, system 300 may be used for managing insurance premiums for a property associated with a property sharing transaction.

In the exemplary embodiment, offerer computer devices 302 may be computers that include a web browser or a software application, which enables offerer computer devices 302 to access remote computer devices, such as PSIM server 306, using the Internet or other network. More specifically, offerer computer devices 302 may be communicatively coupled to PSIM server 306 through many interfaces including, but not limited to, at least one of the Internet, a network, such as the Internet, a local area network (LAN), a wide area network (WAN), or an integrated services digital network (ISDN), a dial-up-connection, a digital subscriber line (DSL), a cellular phone connection, and a cable modem. Offerer computer devices 302 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, offerer computer device 302 may be associated with offerer 104 (shown in FIG. 1).

In the exemplary embodiment, renter computer devices 304 may be computers that include a web browser or a software application, which enables renter computer devices 304 to access remote computer devices, such as PSIM server 306, using the Internet or other network. More specifically, renter computer devices 304 may be communicatively coupled to PSIM server 306 through many interfaces including, but not limited to, at least one of the Internet, a network, such as the Internet, a local area network (LAN), a wide area network (WAN), or an integrated services digital network (ISDN), a dial-up-connection, a digital subscriber line (DSL), a cellular phone connection, and a cable modem. Renter computer devices 325 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, renter computer device 304 may be associated with renter 120.

In the exemplary embodiment, user computer devices 312 may be computers that include a web browser or a software application, which enables user computer devices 312 to access remote computer devices, such as PSIM server 306, using the Internet or other network. More specifically, user computer devices 312 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer devices 312 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

A database server 308 may be communicatively coupled to a database 310 that stores data. In one embodiment, database 310 may include the plurality of offers 107 (shown in FIG. 1), insurer data, the determined 132 time a residence 124 and/or vehicle 126 is rented 128 (shown in FIG. 1), determined and returned 134 reimbursements from offerer insurance provider 101 (shown in FIG. 1), and the transaction and post transaction details (described above with respect to FIG. 1). In the exemplary embodiment, database 310 may be stored remotely from PSIM server 306. In some embodiments, database 310 may be decentralized. In the exemplary embodiment, a user, such as offerer 104, may access database 310 via offerer computer device 302 by logging onto PSIM server 306, as described herein.

An insurance provider device 314 may be communicatively coupled with PSIM server 306. In some embodiments, insurance provider device 314 may be associated with, or is part of a computer network associated with an insurance provider, or in communication with the insurance provider's computer network (not shown). In other embodiments, insurance provider device 314 may be associated with a third party and is merely in communication with the insurance provider's computer network. That is, insurance provider device 314 may be associated with offerer insurance provider 101 and/or a property sharing insurance provider. More specifically, insurance provider device 314 is communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Insurance provider device 314 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

PSIM server 306 may be in communication with a plurality of offerer computer devices 302, a plurality of renter computer devices 304, an insurance provider device 304, and a plurality of user computer devices 312 to offer a plurality of offers 107 for sharing transactions. Furthermore, in some embodiments, insurance provider device 314 may be configured in a network that allows the PSIM sever 306 to communicate changes to renting data stored in PSIM server 306. In some embodiments, PSIM server 306 may be associated with an insurance provider, or in communication with the insurance provider's computer network (not shown). In other embodiments, PSIM server 306 may be associated with a third party and is merely in communication with the insurance provider's computer network.

Exemplary Client Device

Figure 4:
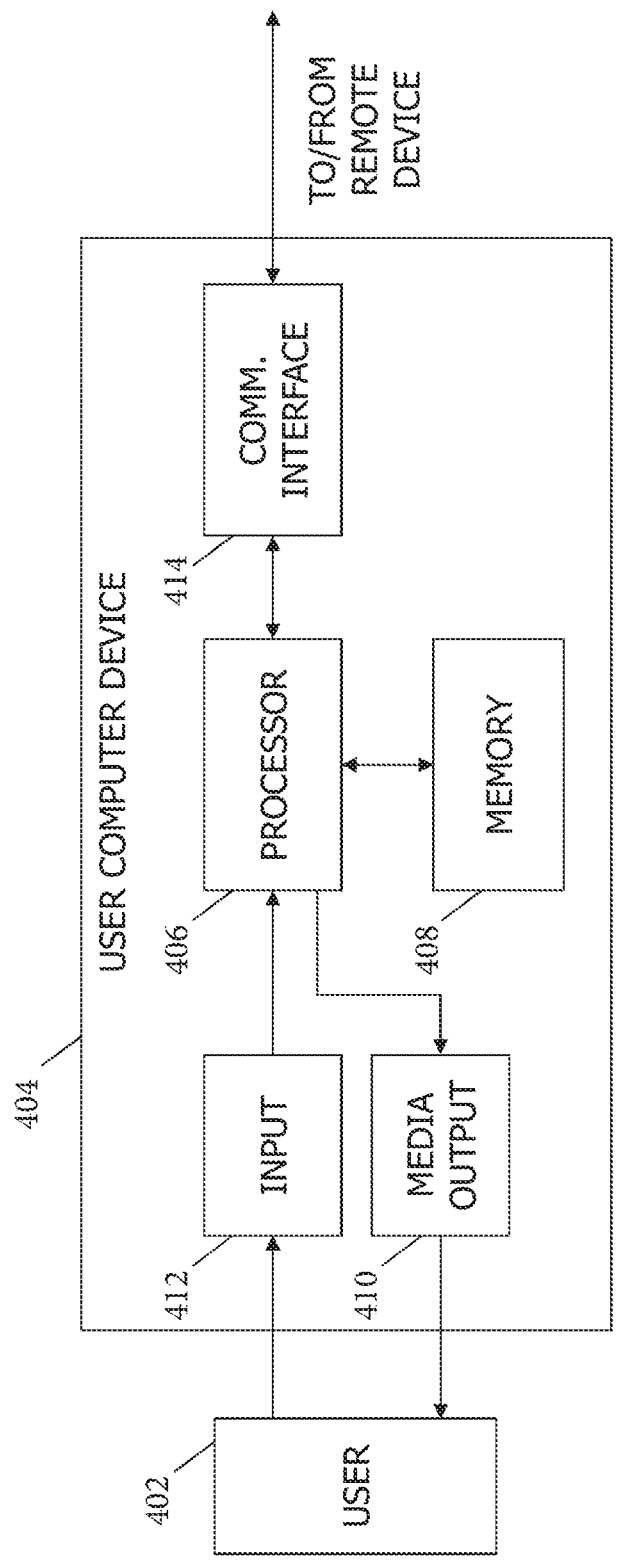
FIG. 4 illustrates an exemplary configuration of a client computer device that may be used with the computer system shown in FIG. 3.

FIG. 4 depicts an exemplary configuration of client computer device, in accordance with one embodiment of the present disclosure. User computer device 404 may be operated by a user 402. User computer device 404 may include, but is not limited to, offerer computer device 302, renter computer device 304, insurance provider device 314, and user computer devices 312 (all shown in FIG. 3). User computer device 312 may include a processor 406 for executing instructions. In some embodiments, executable instructions may be stored in a memory area 408. Processor 406 may include one or more processing units (e.g., in a multi-core configuration). Memory area 408 may be any device allowing information such as executable instructions and/or transaction data to be stored and retrieved. Memory area 408 may include one or more computer readable media.

User computer device 404 may also include at least one media output component 410 for presenting information to user 402. Media output component 410 may be any component capable of conveying information to user 402. In some embodiments, media output component 410 may include an output adapter (not shown) such as a video adapter and/or an audio adapter. An output adapter may be operatively coupled to processor 406 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 410 may be configured to present a graphical user interface (e.g., a web browser and/or a client application) to user 402. A graphical user interface may include, for example, an online store interface for viewing and/or selecting from the plurality of offers 107 (shown in FIG. 1). In some embodiments, user computer device 404 may include an input device 412 for receiving input from user 402. User 402 may use input device 412 to, without limitation, select an offer 107.

Input device 412 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 410 and input device 412.

User computer device 404 may also include a communication interface 414, communicatively coupled to a remote device such as PSIM server 306 (shown in FIG. 3). Communication interface 414 may include, for example, a wired or wireless network adapter and/or a wireless data transceiver for use with a mobile telecommunications network.

Stored in memory area 408 are, for example, computer readable instructions for providing a user interface to user 402 via media output component 410 and, optionally, receiving and processing input from input device 412. A user interface may include, among other possibilities, a web browser and/or a client application. Web browsers enable users, such as user 402, to display and interact with media and other information typically embedded on a web page or a website from PSIM server 306. A client application may allow user 402 to interact with, for example, PSIM server 306. For example, instructions may be stored by a cloud service, and the output of the execution of the instructions sent to the media output component 410.

Exemplary Server Device

Figure 5:
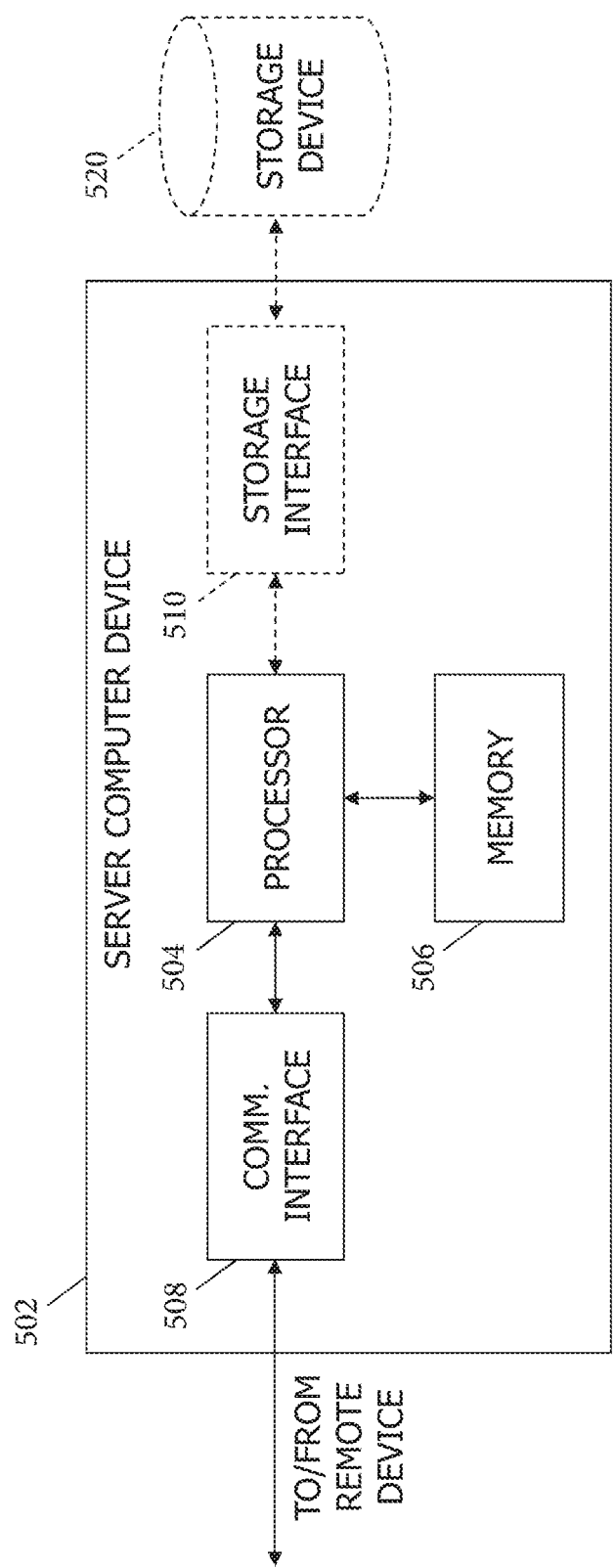
FIG. 5 illustrates an exemplary configuration of a server system that may be used with the computer system shown in FIG. 3.

FIG. 5 depicts an exemplary configuration of server system, in accordance with one embodiment of the present disclosure. Server computer device 502 may include, but is not limited to, PSIM server 110 (shown in FIG. 1), PSIM server 306, and database server 308 (both shown in FIG. 3). Server computer device 502 may also include a processor 504 for executing instructions. Instructions may be stored in a memory area 506. Processor 504 may include one or more processing units (e.g., in a multi-core configuration).

Processor 504 may be operatively coupled to a communication interface 508 such that server computer device 502 is capable of communicating with a remote device such as another server computer device 502, PSIM server 306, offerer computer device 302, renter computer device 304, insurance provider device 314, and user computer device 312 (all shown in FIG. 3). For example, communication interface 508 may receive requests from user computer devices 312 via the Internet, as illustrated in FIG. 3.

Processor 504 may also be operatively coupled to a storage device 520. Storage device 520 may be any computer-operated hardware suitable for storing and/or retrieving data, such as, but not limited to, data associated with database 310 (shown in FIG. 3). In some embodiments, storage device 520 may be integrated in server computer device 502. For example, server computer device 502 may include one or more hard disk drives as storage device 520.

In other embodiments, storage device 520 may be external to server computer device 502 and may be accessed by a plurality of server computer devices 502. For example, storage device 520 may include a storage area network (SAN), a network attached storage (NAS) system, and/or multiple storage units such as hard disks and/or solid state disks in a redundant array of inexpensive disks (RAID) configuration.

In some embodiments, processor 504 may be operatively coupled to storage device 520 via a storage interface 510. Storage interface 510 may be any component capable of providing processor 504 with access to storage device 520. Storage interface 510 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 504 with access to storage device 520.

Processor 504 may execute computer-executable instructions for implementing aspects of the disclosure. In some embodiments, the processor 504 may be transformed into a special purpose microprocessor by executing computer-executable instructions or by otherwise being programmed, as described below in more detail with regard to FIG. 7.

Exemplary Computer Device

Figure 6:
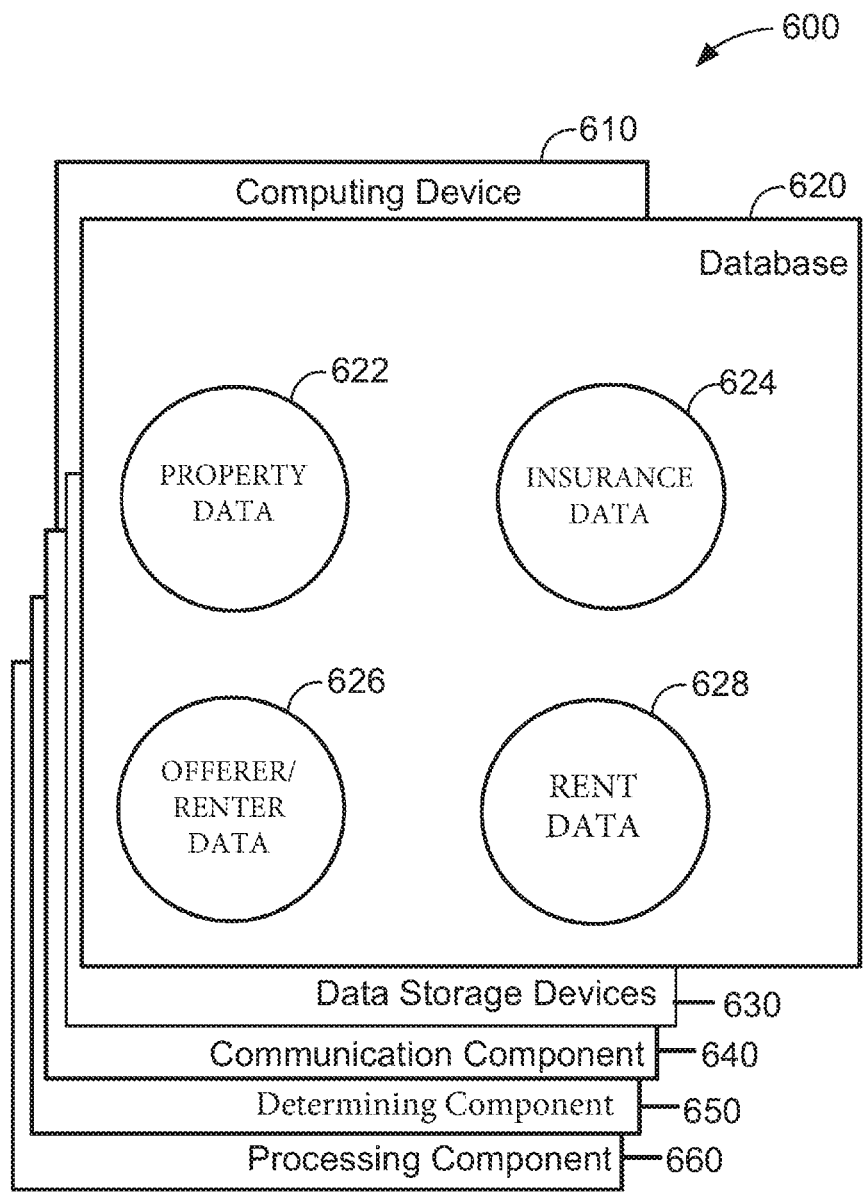
FIG. 6 illustrates a diagram of components of one or more exemplary computing devices that may be used in the system shown in FIG. 1.

FIG. 6 depicts a diagram 600 of components of one or more exemplary computing devices 610 that may be used in process 100 shown in FIG. 1 and system 300 shown in FIG. 3. In some embodiments, computing device 610 may be similar to PSIM server 110 (shown in FIG. 1) and/or PSIM server 306 (both shown in FIG. 3). Database 620 may be coupled with several separate components within computing device 610, which perform specific tasks. In this embodiment, database 620 may include property data 622 (which may be associated with offer 107 shown in FIG. 1), insurance data 624 (which may be related to insurance policies and premiums of offerer 104 associated with offerer insurance provider 101 shown in FIG. 1), offerer and renter data 626 (which may be associated with offerer 104 and renter 120 shown in FIG. 1), and rent data 628 (which may be associated with determined 132 time property is rented as shown in FIG. 1). In some embodiments, database 620 is similar to database 310 (shown in FIG. 3).

Computing device 610 may include the database 620, as well as data storage devices 630. Computing device 610 may also include a communication component 640 for transmitting and receiving data between offerer insurance provider 101 and PSIM server 110 (both shown in FIG. 1). Computing device 610 may further include a determining component 650 for determining 132 a time that a property is rented and a reimbursement for offerer 104 (both shown in FIG. 1). A processing component 660 may assist with execution of computer-executable instructions associated with the system.

Exemplary Computer-Implemented Method for Managing Property Sharing Insurance

Figure 7:
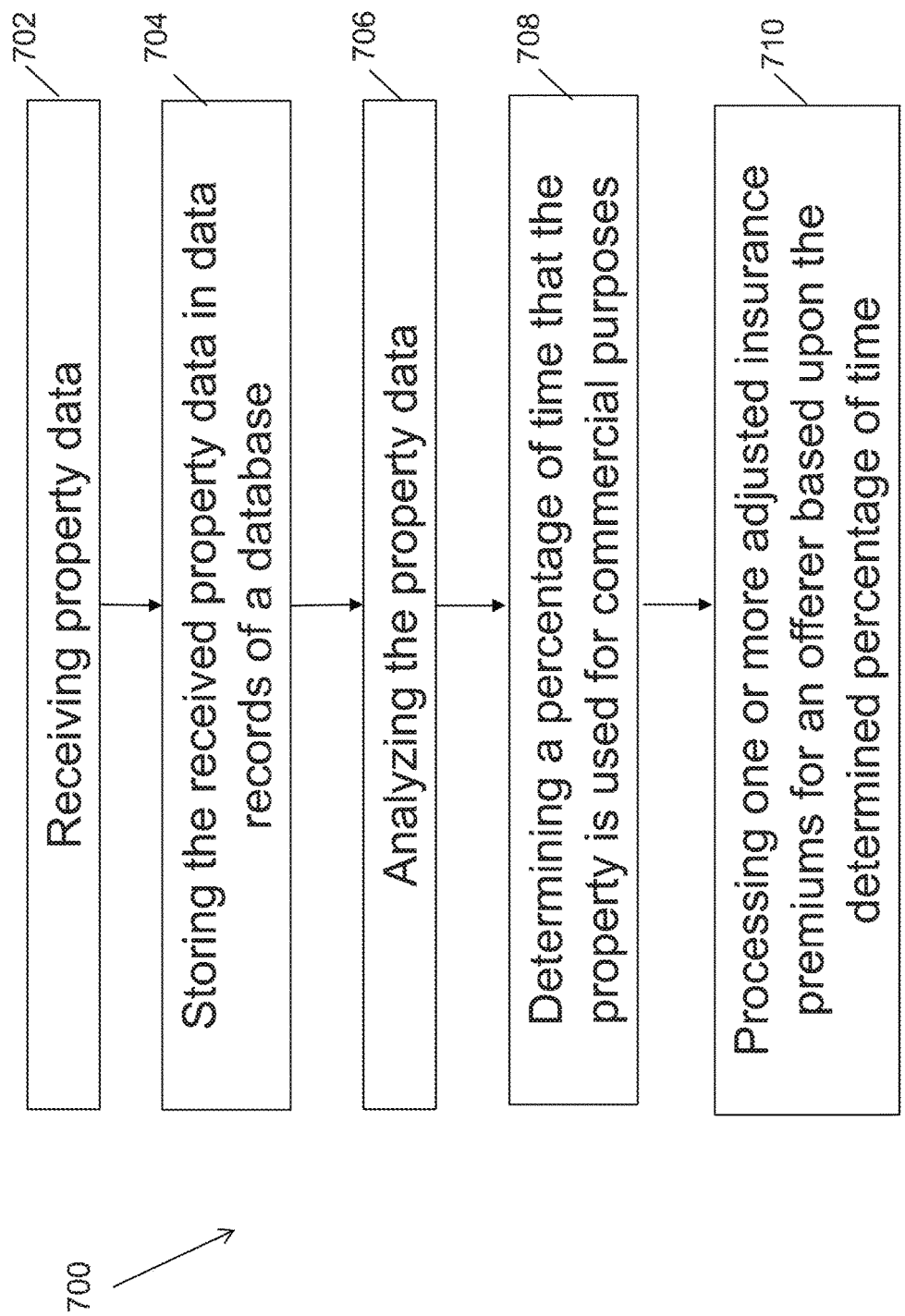
FIG. 7 illustrates a flow chart of an exemplary computer-implemented process for managing property sharing insurance as shown in FIG. 1.

FIG. 7 illustrates a flow chart of an exemplary computer implemented process 700 for managing adjusted insurance premiums for a property associated with a property sharing transaction using process 100 (shown in FIG. 1) and system 300 (shown in FIG. 3). Process 100 may be implemented by a computing device, for example property sharing insurance management ("PSIM") server 110 (shown in FIG. 1) or PSIM server 306 (shown in FIG. 3). In the exemplary embodiment, PSIM server 306 may be in communication with offerer computer device 302 (shown in FIG. 3), renter computer device 304 (shown in FIG. 3), user computer device 312 (shown in FIG. 3), and insurance provider device 314 (shown in FIG. 3).

In the exemplary embodiment, PSIM computer device 306 may receive 702 property rental data (e.g., transaction data, post transaction data, and offerer/renter data, as described with respect to FIG. 1) for one or more properties (e.g., residence 124 and/or vehicle 126 shown in FIG. 1). Property rental data may be associated with offerer 104 (shown in FIG. 1). Examples of offers 107 (shown in FIG. 1) made by offerer 104 include, but are not limited to, residence rental (where offerer's residence 124 is being offered for rent for a period of time), vehicle ride (where offerer 104 is offering to drive renter 120, shown in FIG. 1, from one point to another point), and a vehicle rental (where offerer's vehicle 126 is being offered for use for a period of time). The residence 124 may include, but is not limited to, a house, an apartment, a townhouse, a condominium, a guest house, a mobile home, a shared room, a couch in a living room, and/or any other place to stay. The vehicle 126 may include, but is not limited to, an automobile, a boat, an aircraft, a bicycle, a motorcycle, a recreational vehicle, and/or any other vehicle.

Each offerer 104 may be associated with offerer insurance provider 101 (shown in FIG. 1). In the exemplary embodiment, offerer insurance provider 101 associated with offerer 104 may be insurance provider associated with PSIM server 306. In some further embodiments, PSIM server 306 may be associated with multiple insurance providers and offerer 104 may be associated with one of the offerer insurance providers 101 associated with PSIM server 306.

In the exemplary embodiment, PSIM server 306 may store 704 the received property data in data records of a database (which may be associated with memory 116 shown in FIG. 1 and/or database 310 shown in FIG. 3). In the exemplary embodiment, PSIM server 306 may analyze 706 the property data and determine 708 a percentage of time that the property is used for commercial purposes. Further, in the exemplary embodiment, PSIM server 306 may process 710 one or more adjusted insurance premiums for offerer 104 based upon the determined 708 percentage of time that the property is used for commercial purposes.

Exemplary Embodiments & Functionality

In one aspect, a property sharing insurance management ("PSIM") computing device for analyzing data from a property sharing platform to adjust insurance premiums for an offerer of a property may be provided. The offerer may have an insurance policy on the property and may pay an insurance premium for the insurance policy, and the PSIM computing device may include at least one processor in communication with at least one memory device. The processor may be programmed to (i) receive, from a data source, a plurality of property data, (ii) store the received property data in a plurality of data records in a database, wherein each data record is associated with one property and stores the plurality of property data for that property, (iii) analyze the property data for the property, (iv) determine, based upon the analyzed property data, a percentage of time that the property is used for commercial purposes in an insurance billing cycle, and/or (v) process one or more adjusted insurance premiums for the offerer based upon the determined percentage of time that the property is used for commercial purposes in the insurance billing cycle, wherein the one or more adjusted insurance premiums includes one or more reimbursements of a portion of the insurance premium to the offerer. The PSIM computing device may include additional, less, or alternate functionality, including that discussed elsewhere herein.

For instance, one enhancement may be where the at least one processor is further programmed to (i) obtain an access token from a third party property sharing platform, and (ii) use the obtained access token to obtain the plurality of property data from the third party property sharing platform.

Another enhancement may be where the property sharing platform is hosted by an insurance provider. Another enhancement may be where the property is at least one of a vehicle, a residence, a boat, and an RV.

Another enhancement may be where the property is a vehicle and where the at least one processor is further programmed to (i) determine the number of miles driven by the offerer annually by subtracting a number of miles driven by renters when the vehicle is driven commercially from a total number of miles driven annually, (ii) compare the determined number of miles driven by the offerer annually to an original annual mileage bracket of the insurance policy of the offerer, (iii) determine if the offerer is in a lower annual mileage bracket based upon the comparison, (iv) place the offerer in a lower annual mileage bracket of the insurance policy, and (v) process an adjusted insurance premium for the offerer based upon a difference between an insurance premium of the original annual mileage bracket and an insurance premium of the lower annual mileage bracket.

Another enhancement may be where the at least on processor is further programmed to (i) receive at least one of telematics data from the vehicle and mobile data from a mobile communications device of a renter of the vehicle and (ii) determine usage data for the vehicle including at least one of the time the renter enters and exits the vehicle, a quality of driving of the renter, a driving score of the renter, and an amount of miles driven by the renter.

Another enhancement may be where the one or more reimbursements include at least one of a credit toward an insurance bill for a subsequent insurance billing cycle and a direct deposit into a financial account of the offerer.

In another aspect, a computer-implemented method for analyzing data from a property sharing platform to adjust insurance premiums for an offerer of a property may be provided. The offerer may have an insurance policy on the property and may pay an insurance premium for the insurance policy. The method may be implemented using a PSIM computing device. The method may include (i) receiving, from a data source, a plurality of property data, (ii) storing the received property data in a plurality of data records in a database, wherein each data record is associated with one property and stores the plurality of property data for that property, (iii) analyzing the property data for the property, (iv) determining, based upon the analyzed property data, a percentage of time that the property is used for commercial purposes in an insurance billing cycle, and/or (v) processing one or more adjusted insurance premiums for the offerer based upon the determined percentage of time that the property is used for commercial purposes in the insurance billing cycle, wherein the one or more adjusted insurance premiums includes one or more reimbursements of a portion of the insurance premium to the offerer. The method may include additional, less, or alternate actions, including those discussed elsewhere herein.

In a further aspect, at least one non-transitory computer-readable media having computer-executable instructions thereon may be provided. When executed by at least one processor of a PSIM computing device, the instructions may cause the at least one processor of the PSIM computing device to (i) receive, from a data source, a plurality of property data, (ii) store the received property data in a plurality of data records in a database, wherein each data record is associated with one property and stores the plurality of property data for that property, (iii) analyze the property data for a property, wherein the property is offered by an offerer, and wherein the offerer has an insurance policy on the property and pays an insurance premium for the insurance policy, (iv) determine, based upon the analyzed property data, a percentage of time that the property is used for commercial purposes in an insurance billing cycle, and/or (v) process one or more adjusted insurance premiums for the offerer based upon the determined percentage of time that the property is used for commercial purposes in the insurance billing cycle, wherein the one or more adjusted insurance premiums includes a reimbursement of a portion of the insurance premium to the offerer. The instructions may direct or control additional, less, or alternate functionality, including that discussed elsewhere herein.

Machine Learning and Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, vehicle telematics, autonomous vehicle, and/or intelligent home telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the computer device, the user of the computer device, driver and/or vehicle, home owner and/or home, renter, geolocation information, image data, home sensor data, and/or other data.

Based upon these analyses, the processing element may learn how to identify characteristics and patterns that may then be applied to analyzing sensor data, authentication data, image data, mobile device data, and/or other data. For example, the processing element may learn, with the user's permission or affirmative consent, to predict suggestions for future sharing transactions to the renter. The processing element may also learn how to identify different types of problems and/or issues with offers to assist the offerer based upon transaction and post transaction details.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, e.g., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A property sharing insurance management ("PSIM") computing device for analyzing data from a property sharing platform to adjust insurance premiums for an offerer of a selected property, the offerer having an insurance policy on the selected property and paying an insurance premium for the insurance policy, and the PSIM computing device including at least one processor in communication with at least one memory device, wherein the at least one processor is programmed to:

obtain an access token from the property sharing platform, enabling secure access, by the PSIM computing device, to data stored at the property sharing platform;

receive, using the access token from the property sharing platform, a plurality of property data associated with commercial transactions of a plurality of properties, wherein the commercial transactions are associated with the plurality of properties being used for commercial purposes, and wherein the property data includes a length of time that each property of the plurality of properties was used for commercial purposes under respective terms of the commercial transactions;

store the received property data in a plurality of data records in a database, wherein each data record is associated with one property of the plurality of properties and stores a respective subset of the plurality of property data for that property;

in response to each commercial transaction associated with the selected property being completed, the commercial transaction being completed within a pre-defined interval of time including one insurance billing cycle:

query the database to retrieve a data record for the selected property;

analyze the property data, stored in the retrieved data record, for the selected property;

identify, using machine learning techniques, patterns in the property data for the selected property; and update, based upon the analyzed property data, a percentage of time that the selected property has been used for commercial purposes during the insurance billing cycle, wherein the selected property is insured by both the insurance policy of the offerer and an insurance provider of the property sharing platform for the percentage of time that the selected property is used for commercial purposes;

calculate, when the insurance billing cycle is over, an adjusted insurance premium for the offerer, wherein the adjusted insurance premium includes one or more reimbursements of the insurance premium of the offerer for the percentage of time in the insurance billing cycle that the selected property was used for commercial purposes and insured by both the insurance provider of the offerer and the insurance provider of the property sharing platform;

predict, based upon the identified patterns in the property data for the selected property, recommendations for future commercial transactions for the selected property; and transmit the adjusted insurance premium and the recommendations for future commercial transactions to the offerer.

2. The PSIM computing device of claim 1, wherein the property sharing platform is a third party property sharing platform, and wherein the third party property sharing platform is separate from and in communication with the PSIM computing device.

3. The PSIM computing device of claim 1, wherein the property sharing platform is hosted by an insurance provider.

4. The PSIM computing device of claim 1, wherein the selected property is at least one of a vehicle, a residence, a boat, and a recreational vehicle (RV).

5. The PSIM computing device of claim 4, wherein the selected property is a vehicle, and wherein the at least one processor is further programmed to:

determine the number of miles driven by the offerer annually by subtracting a number of miles driven by renters when the vehicle is driven commercially from a total number of miles driven annually;

compare the determined number of miles driven by the offerer annually to an original annual mileage bracket of the insurance policy of the offerer;

determine if the offerer is in a lower annual mileage bracket based upon the comparison;

place the offerer in a lower annual mileage bracket of the insurance policy; and process an adjusted insurance premium for the offerer based upon a difference between an insurance premium of the original annual mileage bracket and an insurance premium of the lower annual mileage bracket.

6. The PSIM computing device of claim 5, wherein the at least one processor is further programmed to:
   receive at least one of telematics data from the vehicle and mobile data from a mobile communications device of a renter of the vehicle; and
   determine usage data for the vehicle including at least one of the time the renter enters and exits the vehicle, a quality of driving of the renter, a driving score of the renter, and an amount of miles driven by the renter.

7. The PSIM computing device of claim 1, wherein the one or more reimbursements include at least one of a credit toward an insurance bill for a subsequent insurance billing cycle and a direct deposit into a financial account of the offerer.

8. A computer-implemented method for analyzing data from a property sharing platform to adjust insurance premiums for an offerer of a selected property, wherein the offerer has an insurance policy on the selected property and pays an insurance premium for the insurance policy, the method implemented using a property sharing insurance management ("PSIM") computing device including at least one processor in communication with at least one memory, the method comprising:
   obtaining an access token from the property sharing platform, enabling secure access, by the PSIM computing device, to data stored at the property sharing platform;
   receiving, using the access token from the property sharing platform, a plurality of property data associated with commercial transactions of a plurality of properties, wherein the commercial transactions are associated with the plurality of properties being used for commercial purposes, and wherein the property data includes a length of time that each property of the plurality of properties was used for commercial purposes under respective terms of the commercial transactions;
   storing the received property data in a plurality of data records in a database, wherein each data record is associated with one property of the plurality of properties and stores a respective subset of the plurality of property data for that property;
   in response to each commercial transaction associated with the selected property being completed, the commercial transaction being completed within a predefined interval of time including one insurance billing cycle:
      querying the database to retrieve a data record for the selected property;
      analyzing the property data, stored in the retrieved data record, for the selected property;
      identifying, using machine learning techniques, patterns in the property data for the selected property; and
      updating, based upon the analyzed property data, a percentage of time that the selected property has been used for commercial purposes during the insurance billing cycle, wherein the selected property is insured by both the insurance policy of the offerer and an insurance provider of the property sharing platform for the percentage of time that the selected property is used for commercial purposes;
   calculating, when the insurance billing cycle is over, an adjusted insurance premium for the offerer, wherein the adjusted insurance premium includes one or more reimbursements of the insurance premium of the offerer for the percentage of time in the insurance billing cycle that the selected property was used for commercial purposes and insured by both the insurance provider of the offerer and the insurance provider of the property sharing platform;
   predicting, based upon the identified patterns in the property data for the selected property, recommendations for future commercial transactions for the selected property; and
   transmitting the adjusted insurance premium and the recommendations for future commercial transactions to the offerer.

9. The computer-implemented method of claim 8, wherein the property sharing platform is a third party property sharing platform, and wherein the third party property sharing platform is separate from and in communication with the PSIM computing device.

10. The computer-implemented method of claim 8, wherein the property sharing platform is hosted by an insurance provider.

11. The computer-implemented method of claim 8, wherein the selected property is at least one of a vehicle, a residence, a boat, and a recreational vehicle (RV).

12. The computer-implemented method of claim 11, wherein the selected property is a vehicle, and wherein the method further comprises:
   determining the number of miles driven by the offerer annually by subtracting a number of miles driven by renters when the vehicle is driven commercially from a total number of miles driven annually;
   comparing the determined number of miles driven by the offerer annually to an original annual mileage bracket of the insurance policy of the offerer;
   determining if the offerer is in a lower annual mileage bracket based upon the comparison;
   placing the offerer in a lower annual mileage bracket of the insurance policy; and
   processing an adjusted insurance premium for the offerer based upon a difference between an insurance premium of the original annual mileage bracket and an insurance premium of the lower annual mileage bracket.

13. The computer-implemented method of claim 12, wherein the method further comprises:
   receiving at least one of telematics data from the vehicle and mobile data from a mobile communications device of a renter of the vehicle; and
   determining usage data for the vehicle including at least one of the time the renter enters and exits the vehicle, a quality of driving of the renter, a driving score of the renter, and an amount of miles driven by the renter.

14. The computer-implemented method of claim 8, wherein the one or more reimbursements include a credit toward an insurance bill for a subsequent billing period and a direct deposit into a financial account of the offerer.

15. At least one non-transitory computer-readable media having computer-executable instructions thereon, wherein when executed by at least one processor of a property sharing insurance management ("PSIM") computing device in communication with a property sharing platform, cause the at least one processor of the PSIM computing device to:
   obtain an access token from a property sharing platform, enabling secure access, by the PSIM computing device, to data stored at the property sharing platform;
   receive, using the access token from the property sharing platform, a plurality of property data associated with commercial transactions of a plurality of properties, wherein the commercial transactions are associated with the plurality of properties being used for commercial purposes, and wherein the property data includes a length of time that each property of the plurality of properties was used for commercial purposes under respective terms of the commercial transactions;

store the received property data in a plurality of data records in a database, wherein each data record is associated with one property of the plurality of properties and stores a respective subset of the plurality of property data for that property;

in response to each commercial transaction associated with a selected property being completed, the commercial transaction being completed within a predefined interval of time including one insurance billing cycle:
query the database to retrieve a data record for the selected property;
analyze the property data, stored in the retrieved data record, for a selected property of the plurality of properties, wherein the selected property is offered by an offerer, and wherein the offerer has an insurance policy on the selected property and pays an insurance premium for the insurance policy;
identify, using machine learning techniques, patterns in the property data for the selected property; and
update, based upon the analyzed property data, a percentage of time that the selected property has been used for commercial purposes during the insurance billing cycle, wherein the selected property is insured by both the insurance policy of the offerer and an insurance provider of the property sharing platform for the percentage of time that the selected property is used for commercial purposes;

calculate, when the insurance billing cycle is over, an adjusted insurance premium for the offerer, wherein the adjusted insurance premium includes one or more reimbursements of the insurance premium of the offerer for the percentage of time in the insurance billing cycle that the selected property was used for commercial purposes and insured by both the insurance provider of the offerer and the insurance provider of the property sharing platform;

predict, based upon the identified patterns in the property data for the selected property, recommendations for future commercial transactions for the selected property; and transmit the adjusted insurance premium and the recommendations for future commercial transactions to the offerer.

16. The computer-readable media of claim 15, wherein the property sharing platform is a third party property sharing platform, and wherein the third party property sharing platform is separate from and in communication with the PSIM computing device.

17. The computer-readable media of claim 15, wherein the property sharing platform is hosted by an insurance provider.

18. The computer-readable media of claim 15, wherein the selected property is at least one of a vehicle, a residence, a boat, and a recreational vehicle (RV).

19. The computer-readable media of claim 18 further causing the at least one processor of the PSIM computing device to:
determine the number of miles driven by the offerer annually by subtracting a number of miles driven by renters when the vehicle is driven commercially from a total number of miles driven annually;
compare the determined number of miles driven by the offerer annually to an original annual mileage bracket of the insurance policy of the offerer;
determine if the offerer is in a lower annual mileage bracket based upon the comparison;
place the offerer in a lower annual mileage bracket of the insurance policy; and
process an adjusted insurance premium for the offerer based upon a difference between an insurance premium of the original annual mileage bracket and an insurance premium of the lower annual mileage bracket.

20. The computer-readable media of claim 19 further causing the at least one processor of the PSIM computing device to:
receive at least one of telematics data from the vehicle and mobile telematics data from a commercial renter of the vehicle; and
determine usage data for the vehicle including at least one of the time the renter enters the vehicle, a quality of driving of the renter, and an amount of miles being driven by the renter.

* * * * *